(12) United States Patent
Han et al.

(10) Patent No.: US 12,494,517 B2
(45) Date of Patent: Dec. 9, 2025

(54) DEVICE FOR COMPRESSING AT LEAST A PORTION OF AN ENERGY STORAGE CELL, AND SYSTEM AND METHOD FOR ELECTRICAL SAFETY TESTING

(71) Applicant: Bayerische Motoren Werke Aktiengesellschaft, Munich (DE)

(72) Inventors: Wonsup Han, Suwon-Si (KR); Hyunchul Roh, Munich (DE); Nina Zensen, Pfaffenhofen an der Ilm (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 137 days.

(21) Appl. No.: 18/569,667

(22) PCT Filed: May 19, 2022

(86) PCT No.: PCT/EP2022/063563
§ 371 (c)(1),
(2) Date: Dec. 13, 2023

(87) PCT Pub. No.: WO2022/263094
PCT Pub. Date: Dec. 22, 2022

(65) Prior Publication Data
US 2024/0288486 A1 Aug. 29, 2024

(30) Foreign Application Priority Data
Jun. 15, 2021 (DE) ...................... 10 2021 115 451.0

(51) Int. Cl.
*H01M 10/42* (2006.01)
*G01R 31/12* (2020.01)
(Continued)

(52) U.S. Cl.
CPC ........ *H01M 10/4285* (2013.01); *G01R 31/16* (2013.01); *G01R 31/3865* (2019.01); *H01M 10/0468* (2013.01); *G01R 31/12* (2013.01)

(58) Field of Classification Search
CPC ......... H01M 10/0481; H01M 10/4285; H01M 10/48; H01M 10/484; H01M 10/0468;
(Continued)

(56) References Cited

U.S. PATENT DOCUMENTS 5,348,813 A * 9/1994 Bohmer ................ H01M 10/48
429/66
5,618,641 A * 4/1997 Arias ................ H01M 10/0413
29/623.2
(Continued)

FOREIGN PATENT DOCUMENTS

CN 211293185 U 8/2020
DE 10 2012 214 231 A1 2/2014
(Continued)

OTHER PUBLICATIONS

International Search Report (PCT/ISA/210) issued in PCT Application No. PCT/EP2022/063563 dated Sep. 19, 2022 with English translation (4 pages).
(Continued)

*Primary Examiner* — Steven L Yeninas
(74) *Attorney, Agent, or Firm* — Crowell & Moring LLP (57) ABSTRACT

A device for compressing a portion of an energy storage cell includes a first shell element having a first receiving portion designed to receive the portion of the energy storage cell, and a second shell element, movable relative to the first shell element between an open position and a closed position. When the second shell element is in the open position, the portion of the energy storage cell can be inserted into the device such that the portion of the energy storage cell is (Continued)

received into the first receiving portion. When the second shell element is in the closed position, the first and second shell elements jointly define a cavity containing the first receiving portion and being designed to clampingly hold the portion of the energy storage cell substantially elastically compressed. A system and method for compressing the portion of the energy storage cell are also provided.

19 Claims, 6 Drawing Sheets

(51) Int. Cl.
    *G01R 31/16*     (2006.01)
    *G01R 31/385*     (2019.01)
    *H01M 10/04*     (2006.01)

(58) Field of Classification Search
    CPC ... G01R 31/36; G01R 31/385; G01R 31/3865
    See application file for complete search history.

(56) References Cited

U.S. PATENT DOCUMENTS

| | | | |
|---|---|---|---|
| 10,218,033 B1* | 2/2019 | Bhardwaj | H01M 50/121 |
| 12,153,024 B2* | 11/2024 | Kim | G01N 3/062 |
| 2001/0052778 A1 | 12/2001 | Smith | |
| 2011/0300416 A1* | 12/2011 | Bertness | H01M 10/4285 |
| | | | 324/426 |
| 2014/0093760 A1* | 4/2014 | Hermann | B60L 50/64 |
| | | | 429/66 |
| 2016/0172636 A1* | 6/2016 | Okahata | H01M 50/211 |
| | | | 429/162 |
| 2017/0133705 A1* | 5/2017 | Niwa | H01M 50/291 |
| 2018/0337383 A1 | 11/2018 | Tanabe et al. | |
| 2019/0190064 A1* | 6/2019 | Fujiki | H01M 4/661 |
| 2020/0072907 A1* | 3/2020 | Regef | G01R 31/392 |
| 2020/0365931 A1* | 11/2020 | Ogata | H01M 50/121 |
| 2021/0190874 A1* | 6/2021 | Kim | H01M 10/482 |
| 2021/0194063 A1* | 6/2021 | Oe | H01M 10/0468 |
| 2021/0226265 A1* | 7/2021 | Lee | H01M 10/486 |
| 2023/0073815 A1* | 3/2023 | Kim | G01R 31/382 |
| 2024/0421367 A1* | 12/2024 | Davis | H01M 10/613 |

FOREIGN PATENT DOCUMENTS

| | | |
|---|---|---|
| DE | 10 2012 214 738 A1 | 2/2014 |
| EP | 3 407 404 A | 11/2018 |
| JP | 2000-329814 A | 11/2000 |
| JP | 2009-48971 A | 3/2009 |
| KR | 10-1983849 B1 | 9/2019 |

OTHER PUBLICATIONS

German-language Written Opinion (PCT/ISA/237) issued in PCT Application No. PCT/EP2022/063563 dated Sep. 19, 2023, with English translation (11 pages).

German Search Report issued in German Application No. 10 2021 115 451.0 dated Mar. 3, 2022 with partial English translation (10 pages).

* cited by examiner

DEVICE FOR COMPRESSING AT LEAST A PORTION OF AN ENERGY STORAGE CELL, AND SYSTEM AND METHOD FOR ELECTRICAL SAFETY TESTING

BACKGROUND AND SUMMARY

The invention relates to a device for compressing at least a portion of an energy storage cell and also to a system and a method for the electrical safety testing of a portion of an energy storage cell by means of said device.

Modern energy storage cells, such as lithium-ion accumulators (lithium-ion secondary batteries) generally have an electrode assembly which has an anode structure, a cathode structure and a separator arranged between the anode structure and the cathode structure and is arranged together with an electrolyte in a housing of the energy storage cell. The anode structure and the cathode structure comprise the respective, usually metal electrode (for example, the anode: copper; the cathode: aluminum), which is coated with an active material (for example, on the anode side: graphite; on the cathode side: lithium-cobalt oxide or lithium-manganese oxide). The housing (in the case of cylindrical energy storage cells referred to as a "can") is usually coated on the outside with an insulator.

While the insulator normally electrically insulates the housing with respect to the surroundings, the separator is often intended to be permeable only to lithium ions. If, however, in the production of such energy storage cells contaminating particles, such as for example shards or burrs, from one of the metal electrodes penetrate into the active material, and in particular into the separator, the risk of a short-circuit between the anode structure and the cathode structure increases. In order to reduce this risk during the use of the energy storage cell by the user, energy storage cells may in the course of the production process be subjected to an electrical safety test, for example a high-voltage test (so-called "hipot test") at voltages of 400 V to 800 V.

A method for testing a battery for the voltage it can withstand is known for example from the document CN 211293185 U. This document describes a device for testing the voltage that can be withstood by a battery, which comprises a supporting plate with at least two pairs of test probes. The pairs of test probes can be elastically pressed against a cell busbar of the battery, each pair of test probes consisting of test probes made to match each other.

Against this background, an object of the present invention is to provide a device which allows at least a portion of an energy storage cell to be efficiently and comparatively easily investigated for defects due to contaminating particles with high precision in an electrical safety test. In addition, an object of the present invention is to provide a corresponding system and a corresponding method for the electrical safety testing of at least a portion of an energy storage cell.

The device is intended for compressing (i.e., pressing together) at least a portion of an energy storage cell and comprises a first shell element with a first receiving portion and also a second shell element. The first receiving portion is designed to at least partly receive the portion of the energy storage cell. The second shell element can be moved relative to the first shell element between an open position and a closed position. In the open position of the second shell element, the portion of the energy storage cell can be inserted into the device such that it is at least partly received in the first receiving portion. The first shell element and the second shell element in the closed position together define a cavity, which includes the first receiving portion and is designed to hold the portion of the energy storage cell clamped in place in such a way that the portion is substantially (only) elastically compressed.

The device according to the invention is therefore designed in particular such that, in the closed position of the second shell element, the portion of the energy storage cell is pressed together in a predefined way which is adapted as a result of the dimensions of the cavity on the basis of the dimensions of the portion of the energy storage cell. The closed position of the second shell element with respect to the first shell element may be distinguished in particular by the fact that the cavity assumes its minimum volume or its minimum dimensions and/or the first shell element is stopped from moving further in the direction of the second shell element by a limiting feature of the device. Since the portion of the energy storage cell is substantially elastically compressed, after the compression is released, when it is therefore no longer clamped in place between the first shell element and the second shell element, in particular in the open position, it can substantially assume its original shape and size. Substantially elastically compressed means here elastically compressed/pressed together. In this context, the portion is substantially elastically compressed when its dimensions before and after being pressed together differ by at most 10% or at most 5% or at most 2%.

The device according to the invention allows the portion of the energy storage cell, for example, a wound electrode assembly (electrode coil) to be pressed together in a predefined manner, which is adapted to the dimensions of the portion, without damaging or even destroying it. The invention is based in particular on the finding that, as a result of the compression, mainly the porous, soft layers of the energy storage cell, in particular the separator or the insulating layer, are compressed. Foreign bodies located in these layers, such as burrs or metal particles, which during the lifetime of the energy storage cell can lead to a short-circuit and ultimately cause a fire, are much stiffer than the separator or the insulating layer and are therefore at most only slightly compressed.

As a result of the substantially elastic compression of the portion, the distance between the foreign body and the anode structure and the distance between the foreign body and the cathode structure can be reduced, so that the electrical safety test, in particular a voltage withstand test or high-voltage test (hipot test) can be carried out at lower voltages. The portion of the energy storage cell can thus be investigated less aggressively. In addition, the invention makes allowance for the fact that the energy storage cell swells slightly over its lifetime, the internal pressure in the cell increasing, and in particular the separator being pressed together. It therefore allows this state to be simulated in a synergistic manner during the high-voltage test and defective energy storage cells, in particular energy storage cells with increased risk of short-circuiting, to be reliably determined.

The invention may be used in particular for cylindrical energy storage cells or prismatic energy storage cells. In any event, the cavity (in the closed position) can correspond with respect to its size and geometry substantially to the portion of the energy storage cell in its final substantially elastically compressed state. In other words, the shape and dimensions of the cavity correspond substantially to the shape and dimensions of the compressed portion of the energy storage cell. In particular, it may be provided that the cavity has the same symmetries as the portion of the energy storage cell.

The portion of the energy storage cell may comprise or be an electrode assembly of the energy storage cell, a housing of the energy storage cell with an outer insulating layer or a housing of the energy storage cell with an outer insulating layer and an electrode assembly arranged in the housing. The portion may also be formed by the entire energy storage cell. The insulating layer may be a polyethylene terephthalate film (PET film). The electrode assembly may in particular be stacked or wound into a cylindrical or flat electrode coil (so-called jelly roll). It may include an anode structure, a cathode structure and a separator arranged between the anode structure and the cathode structure. In each of these cases, the elastic compression of the portion may comprise a compression of the separator in a transversal direction with respect to its central main plane. In the context of this disclosure, this transversal direction is also referred to as the radial direction both in the case of cylindrical energy storage cells and in the case of prismatic energy storage cells. In the case of the latter, the radial direction may consequently correspond to a direction transverse to the main direction of extent of the energy storage cell.

The device may be designed in the form of a case or coffin. Preferably, the first shell element and the second shell element have the same shape and/or the same cross section. It may be provided in particular that the second shell element has a second receiving portion. In this case, the cavity may comprise not only the first receiving portion but also the second receiving portion. The first and/or the second receiving portion is preferably formed as a depression in the first/second shell element, so that, in the open position of the second shell element, the portion of the energy storage cell can be positioned in the first/second receiving portion. Furthermore, the first shell element and the second shell element in the closed position may be formed surface-symmetrically with respect to a plane of symmetry running centrally between the first shell element and the second shell element.

In a variant, the first shell element and the second shell element are formed as two preferably (substantially) identical half-shells. That shell element in which the portion of the energy storage cell is not positioned in the open position can consequently be simply swung or placed onto the portion of the energy storage cell and the corresponding further shell element in order to bring the second shell element into its closed state. The first shell element and the second shell element may have a C-shaped cross section. Especially a cylindrical energy storage cell in this way can be pressed together relatively easily along its entire outer circumference.

It has been stated that the device may preferably be provided with a limiting feature for the minimum cavity volume. This limiting feature may be formed for example as a contact portion between the first shell element and the second shell element, with which the two shell elements are in (direct or indirect) contact. If the first shell element and the second shell element have a C-shaped cross section, the contact portion is preferably arranged, when considered in cross section, against the legs extending away from the base portion, in particular against the ends of these legs facing away from the base portion. The limiting feature may also comprise fastening means which are arranged on the outside of the first shell element and the second shell element and may be designed to keep the second shell element in the closed position. The fastening means may comprise for example one or more hinges, bolts and/or toggle-type fasteners.

The limiting feature preferably has the function of limiting the compression of the portion of the energy storage cell by the first shell element and the second shell element substantially to the elastic limit of the portion of the energy storage cell. If the portion of the energy storage cell comprises multiple layers (in particular metal electrodes, active materials and separator), this elastic limit may relate to the entirety of all the layers or alternatively to that layer of the portion with the lowest modulus of elasticity, in particular the separator or the insulating layer on the outer circumferential surface of the energy storage cell. Substantially to the elastic limit means here that the elastic limit cannot be exceeded at all, or as a maximum by 5% or as a maximum by 10%, with respect to the compression in the radial direction. In the latter two cases, consequently negligible plastic compression takes place.

The limitation of the compression by the limiting feature may take place by means of a direct limitation of the force/clamping exerted on the portion of the energy storage cell and/or by means of a direct limitation of the compression by limiting displacement. If the portion of a cylindrical energy storage cell has for example a separator with a thickness of X and the electrode structure comprises N windings (turns about the longitudinal axis of the electrode coil), assuming that the compression of the metal electrodes and the active materials is negligible, the compression by 10% has the effect that the portion is reduced by a difference in diameter of $D=X*N*0.1$. With 50 windings and a thickness of the separator of 20 μm, this difference is for example 100 μm.

In the closed position of the second shell element, the portion of the energy storage cell can be located substantially completely in the cavity, i.e., can be enclosed by the walls delimiting the cavity. The cavity can be substantially closed. In particular, the first shell element and the second shell element may respectively have a cavity-delimiting, substantially preferably closed inner wall, which can be in contact with the portion of the energy storage cell. This is of advantage in particular whenever the geometrical shape of the cavity substantially corresponds to the geometrical shape of the portion of the energy storage cell, in particular in the clamped-in-place/substantially elastically compressed state. While the first receiving portion and/or the second receiving portion is preferably designed to hold the portion of the energy storage cell in an interlocking manner in the open position, this interlocking way of holding it can be changed into a frictionally engaging way of holding it between the two shell elements by bringing the second shell element into its closed position.

The dimensions of the energy storage cell in the compressed state (when the second shell element is in the closed position) are defined by the dimensions of the cavity. Therefore, the device is designed for use with a specific portion of an energy storage cell (for example, the electrode coil or the housing with the insulating layer). It follows from this that the dimensions of the (uncompressed or compressed) energy storage cell define the dimensions of the cavity. The cavity may be dimensioned, in particular radially, that is to say in a direction perpendicular to the main direction of extent of the portion of the energy storage cell, such that the portion of the energy storage cell is elastically compressed by a predetermined amount in this direction when the second shell element is in the closed position. At this point, the combination of the device according to the invention with the associated portion of the energy storage cell should also be explicitly disclosed.

The device may also comprise a stretchable hose element, which can be inserted preferably along a plane or axis running between the first and the second shell element in the closed position into a region between the first shell element and the second shell element. For this, the first shell element and/or the second shell element are provided on one or both end faces respectively with an opening/bore corresponding to the hose element. The stretchable hose element inserted into the region between the first shell element and the second shell element preferably delimits the cavity in such a way that the cavity in this case extends between the outer circumferential surface of the hose element and the inner circumferential surface of the first shell element and the second shell element.

If the portion of the energy storage cell is an electrode assembly wound around a winding axis (cylindrical coil or flat coil), the hose element preferably extends parallel to or along the winding axis in the interior space of the wound electrode assembly, advantageously through the wound electrode assembly. The stretchable hose element is preferably designed to increase its (outer) diameter by increasing the pressure of the medium in its interior. It can as a result press the portion of the energy storage cell radially outward in the direction of the first shell element and/or the second shell element in order to contribute to the desired compression.

The compression of the portion of the energy storage cell preferably takes place by reduction of the volume between the first shell element and the second shell element that is available to the portion of the energy storage cell, in particular the volume of the cavity. This reduction may, as described above, be provided exclusively by interaction of the first shell element and the second shell element during movement into the closed position (without the hose element). Alternatively, the portion of the energy storage cell may be inserted between the first shell element and the second shell element and the second shell element brought into its closed position without compression of the portion of the energy storage cell. In this case, the stretchable hose element may be inserted into the portion of the energy storage cell, in particular into the core of the portion, and stretched in such a way that it presses the portion of the energy storage cell radially outward against the inner wall of the first shell element and the second shell element.

Furthermore, said two compression mechanisms may be combined with one another in such a way that one part of the compression is brought about by moving the second shell element into the closed position and a further part of the compression is brought about by stretching the hose element and correspondingly pressing the portion of the energy storage cell radially outward against the inner wall of the first shell element and the second shell element. In the case of cylindrical energy storage cells with an outer diameter of 19 mm to 21 mm (for example, of the type 21700, 20650 or 19650), the compressive force for the compression of the wound electrode assembly is preferably between 4 kN and 20 kN, most preferably approximately 6 kN, and for the compression of the housing of the energy storage cell with the outer insulating layer preferably between 4 kN and 40 kN, most preferably approximately 15 kN. If the compression takes place by using the stretchable hose element, the internal pressure of the hose element used for this purpose is preferably between 0.5 bar and 3 bar, most preferably between 1 bar and 2 bar, in each case above ambient pressure.

The system proposed here is intended for the electrical safety testing of a portion of an energy storage cell and comprises a device, described in detail above, for compressing the at least one portion of the energy storage cell and also a device for electrical safety testing. Preferably, the electrical safety test is a high-voltage or voltage withstand test. Correspondingly, the device includes in particular a high-voltage tester. This may be designed to carry out the electrical safety test on the portion of the energy storage cell in particular with a predetermined voltage in the range of 50 V to 100 V. As explained above, comparatively low voltages are sufficient for testing the voltage that can be withstood when the portion of the energy storage cell is compressed by means of the device according to the invention.

The method according to the invention is used for the electrical safety testing of a portion of an energy storage cell and comprises the following steps: providing a device described above for compressing at least a portion of an energy storage cell or a system described above with this device, the second shell element being in the open position, positioning at least a region of the portion of the energy storage cell in the first receiving portion, closing the device by moving the second shell element out of its open position into its closed position, the portion of the energy storage cell being clamped in place in the cavity in such a way that the portion of the energy storage cell is substantially elastically compressed, and carrying out an electrical safety test, in particular a voltage withstand test, on the elastically compressed portion of the energy storage cell.

If the device comprises the stretchable hose element, in the method it may be inserted into the portion of the energy storage cell, preferably into the core of the energy storage cell, in particular parallel to the winding axis. The volume of the cavity, in particular its extent in the radial direction, can be reduced by applying pressure to the interior volume of the hose element in order to press/compress the portion of the energy storage cell in the direction of the first shell element and/or the second shell element. In a preferred variant, the voltage withstand test is performed at a maximum voltage of less than 200 V, in particular less than 150 V, preferably at most 100 V.

In addition, this method may have any of the features described above in conjunction with the device and/or the system. In particular, the method may include any desired functions of the device or the system and components thereof as method steps.

Preferred embodiments of a device for compressing at least a portion of an energy storage cell and a system for electrical safety testing are now explained in more detail with reference to the appended schematic drawings.

DETAILED DESCRIPTION OF THE DRAWINGS

Figure 1:
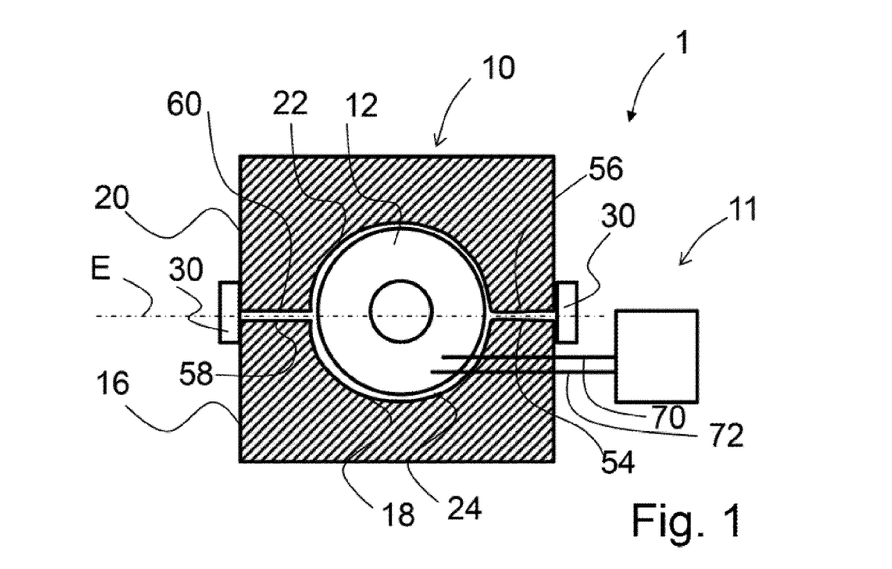
FIG. 1 shows a first embodiment of a system for electrical safety testing with a device for compressing at least a portion of an energy storage cell in a cross-sectional view, the second shell element being in its closed position.
Figure 2:
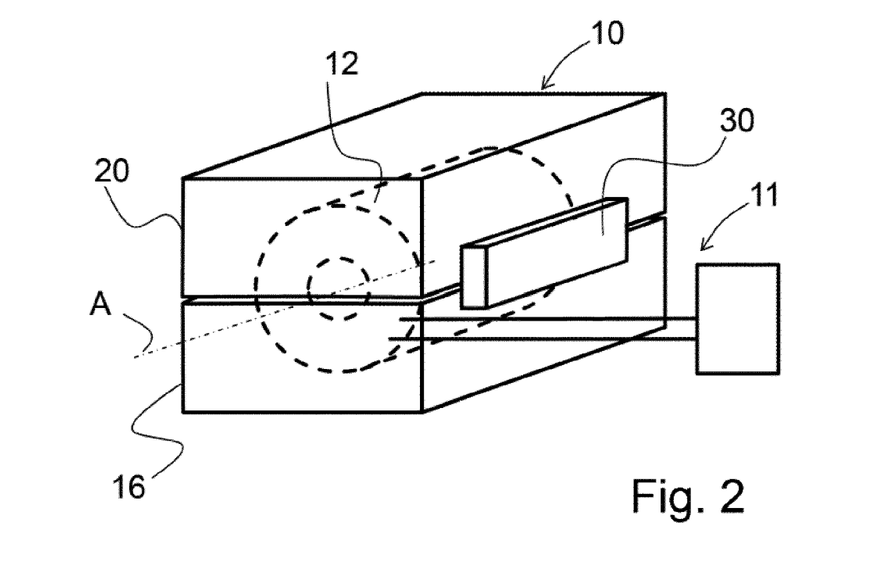
FIG. 2 shows the system from FIG. 1 in a perspective view, the second shell element being in its closed position.
Figure 3:
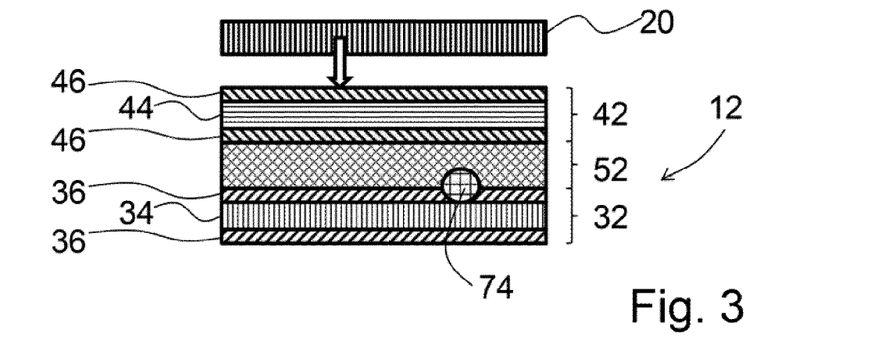
FIGS. 3 to 5 show the device of the system from FIG. 1 in each case in a partial cross-sectional view, the second shell element being moved from its open position (FIG. 3) successively into its closed position (FIG. 5)
Figure 4:
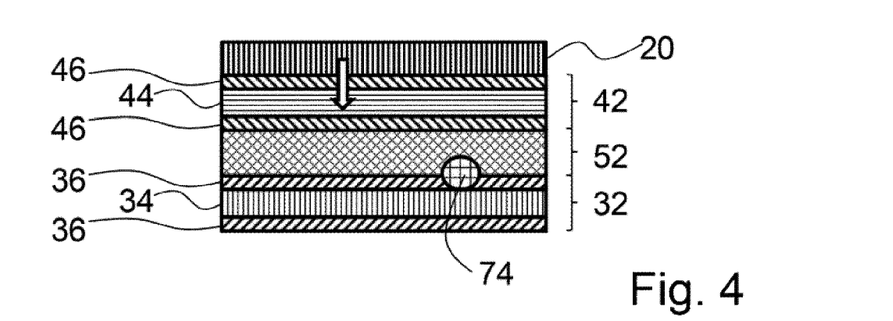
Figure 5:
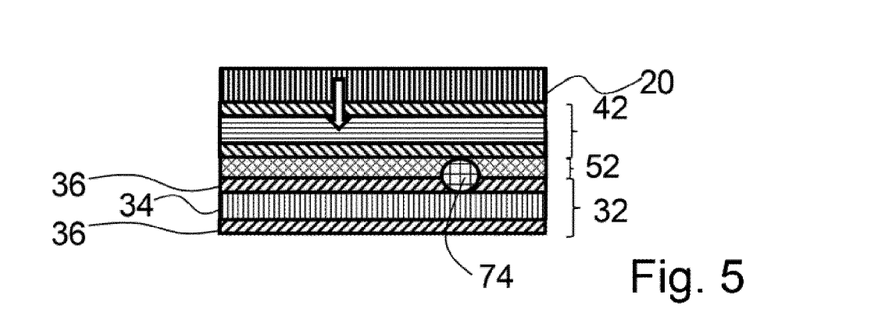

FIGS. 1, 2 and 5 show a system 1 for the electrical safety testing of a portion 12 of an energy storage cell. The system comprises a device 10 for compressing the portion 12 and also a device 11 for electrical safety testing, which is designed as a high-voltage tester. In this case, the energy storage cell is a cylindrical energy storage cell, in particular a cylindrical lithium-ion secondary battery (so-called lithium-ion accumulator). The portion 12 is an electrode assembly, in this variant wound around a winding axis A, with an anode structure 32, a cathode structure 42 and a separator 52 arranged between the anode structure 32 and the cathode structure 42 (see FIGS. 3 to 5), and, in the state in which it is not clamped in place in the device 10, has a predetermined diameter. The anode structure 32 includes a metal electrode 34 (for example, of copper), which bears an active material 36 (here in the form of carbon, in particular graphite). By analogy with this, the cathode structure 42 includes a metal electrode 44 (for example, of aluminum), which bears an active material 46 (for example, in the form of lithium-manganese oxide). The separator is produced from a polymer.

The device 10 has a first shell element 16 with a first receiving portion 18 and a second shell element 20 with a second receiving portion 22. The shell elements 16, 20 are formed here as uniform half-shells. When the second shell element 20 is in its open position, the portion 12 of the energy storage cell can be inserted into the first or the second receiving portion 18, 20, so that in cross section, when considered from FIG. 1, the portion 12 is de facto held in an interlocking manner half and half in the respective receiving portion 18, 20.

Subsequently, the device 10 is closed, the second shell element 20 is therefore moved relative to the first shell element 16 into its closed position (cf. FIGS. 1 and 2). In order to carry out this movement, schematically shown in FIGS. 3 to 5, in a manner such that it is adapted to the portion 12 of the energy storage cell and controlled, the device 10 has a limiting feature 30, which limits the maximum compression of the portion 12. Here, the limiting feature 30 is of a multipart form. A first part of the limiting feature 30, for example, a hinge, connects the shell elements 16, 20 on a first side of the device 10 and a second part of the limiting device 30, for example, a toggle-type fastener, connects the shell elements 16, 20 on a second side of the device 10, opposite from the first side. Alternatively, the limiting feature 30 may be formed by contact portions 54, 56 and 58, 60 of the two shell elements 16, 20, in particular on legs of the half-shells facing the other shell element 16, 20, respectively.

During the closing movement, the second shell element 20 consequently approaches the first shell element 16, until the portion 12 of the energy storage cell is held in an interlocking manner in the two receiving portions 18, 22 (intermediate state from FIG. 4). Subsequently, the two shell elements 16, 20 are moved further toward each other up to the closed position from FIG. 5, in which the receiving portions 18, 22 together form a cylindrical cavity 24 between the first and the second shell elements 16, 20. This cavity 24 has the same symmetries as the portion 12 of the energy storage cell, and is in particular plane-symmetrical with respect to a plane of symmetry E of the first and the second shell elements 16, 20. Since the diameter of the cavity 24 is smaller by a predetermined amount than the diameter of the portion of the energy storage cell, the portion 12 is elastically pressed. This deformation is substantially encountered in the separator 52, since the other components of the electrode assembly are much stiffer than the separator 52. The limiting feature 30 ensures that the separator 52 is deformed in a predefined way, preferably to its elastic limit, but at most slightly plastically. The thickness of the separator 52 is reduced during the compression by at most 10%, preferably between 5% and 10%.

The device 11 for electrical safety testing is in electrical connection with the anode structure 32 and the cathode structure 42 by way of connecting lines 70, 72 and is designed, in particular programmed, such that it carries out the high-voltage test with at most 200 V, preferably with at most 150 V, most preferably with at most 100 V. The risk of a short circuit potentially occurring during the lifetime of the energy storage cell as a result of the swelling of the energy storage cell in combination with the presence of a possible foreign body 74 in the separator 52 can thus be determined in a manner that is relatively easy and not aggressive for the portion 12 of the energy storage cell.

Figure 6:
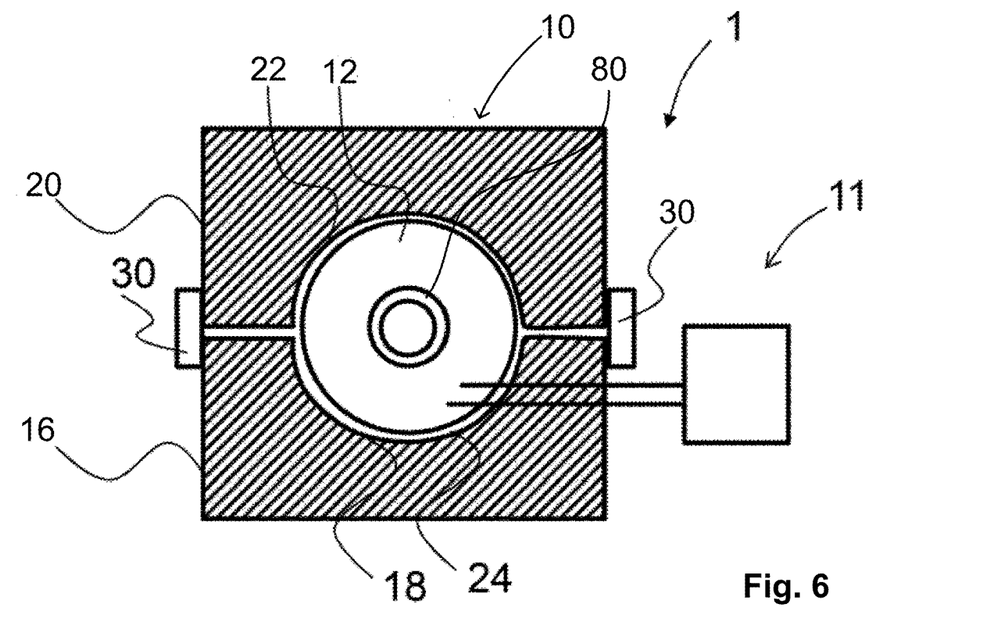
FIG. 6 shows a second embodiment of a system for electrical safety testing with a device for compressing at least a portion of an energy storage cell in a cross-sectional view, the second shell element being in its closed position.
Figure 7:
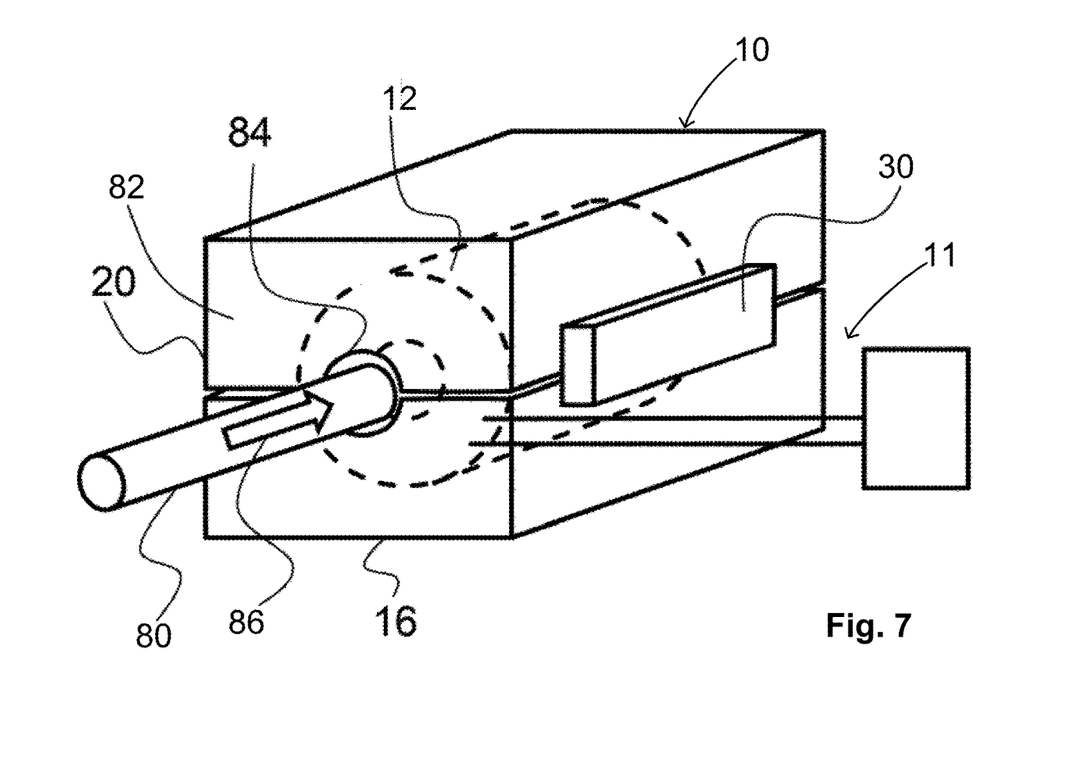
FIG. 7 shows the system from FIG. 6 in a perspective view, the second shell element being in its closed position.
Figure 8:
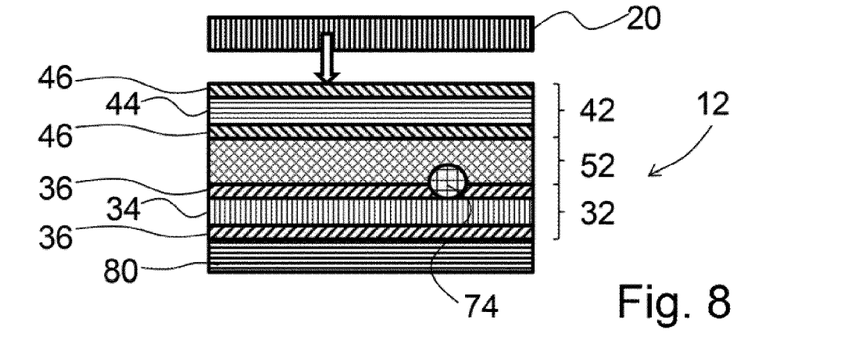
FIGS. 8 to 10 show the device of the system from FIG. 6 in each case in a partial cross-sectional view, the second shell element being moved from its open position (FIG. 8) successively into its closed position (FIG. 10)
Figure 9:
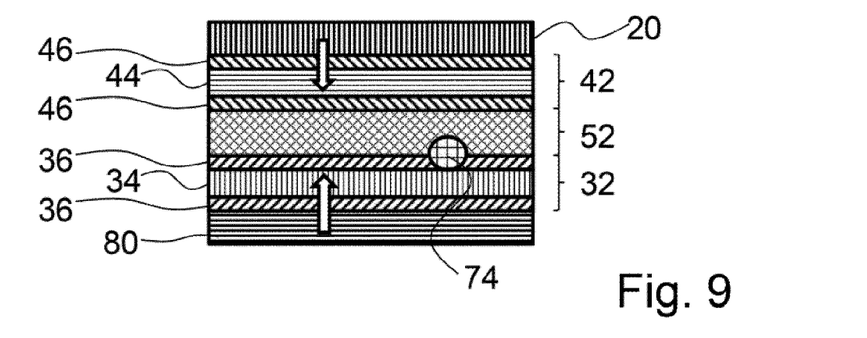
Figure 10:
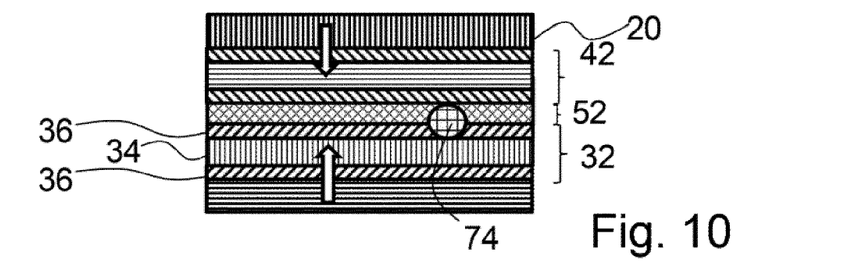

The system 1 from FIG. 6 only differs from the system 1 from FIG. 1 with respect to its device 10 for compressing at least a portion 12 of an energy storage cell. This device 10 additionally includes a radially stretchable/flexible hose element 80, which, in particular in the closed position according to FIGS. 6 and 7, is inserted (cf. arrow 86 in FIG. 7) axially (along the axis A) into the core of the portion 12 of the energy storage cell through a hole 84 formed in the end wall 82 of the device 10. By increasing the pressure of the medium (preferably a fluid, in particular a gas or a liquid) in the interior of this stretchable/flexible hose element 80, the hose element 80 expands radially and thus additionally presses from the inside against the portion 12 (the electrode assembly). Consequently, as shown in FIGS. 8 to 10, the compression of the portion 12, in particular the separator 52, is brought about anti-radially from the outside by the two shell elements 16, 20 and radially from the inside by the hose element 80. Otherwise, the system 1 from FIG. 6 can have any, in particular all, of the features of the system from FIG. 1.

Figure 11:
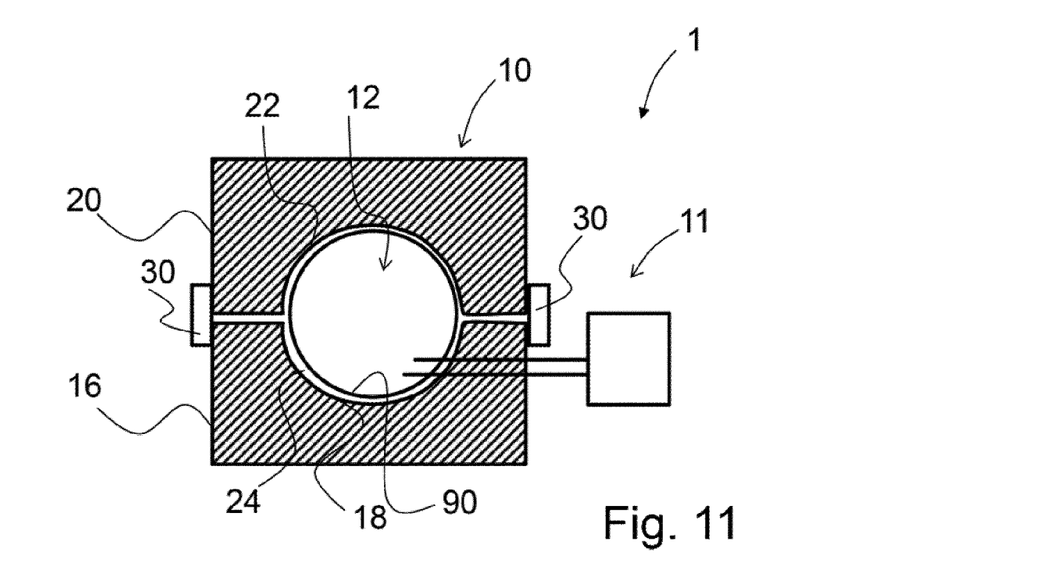
FIG. 11 shows a third embodiment of a system for electrical safety testing with a device for compressing at least a portion of an energy storage cell in a cross-sectional view, the second shell element being in its closed position.
Figure 12:
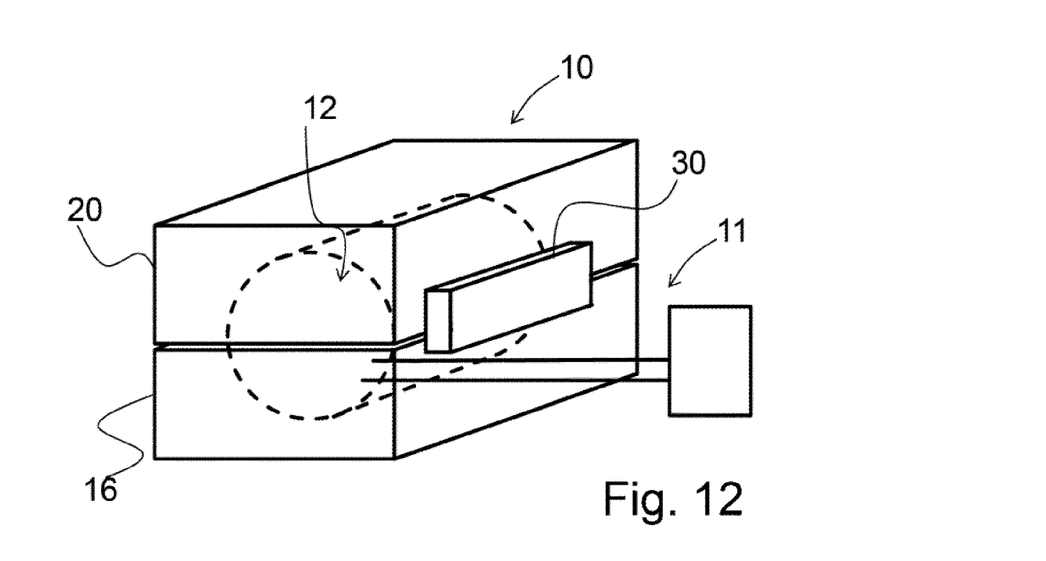
FIG. 12 shows the system from FIG. 11 in a perspective view, the second shell element being in its closed position.
Figure 13:
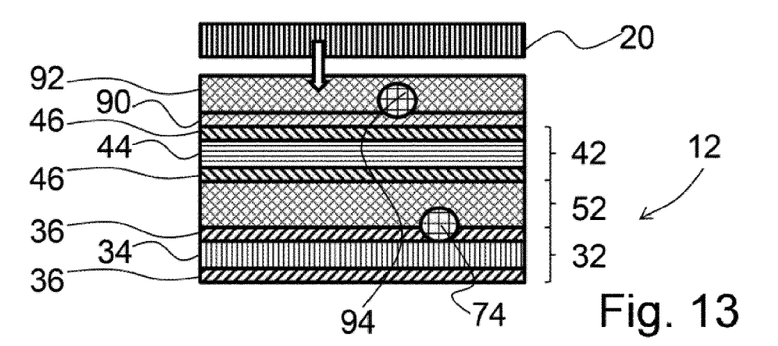
FIGS. 13 to 15 show the device of the system from FIG. 11 in each case in a partial cross-sectional view, the second shell element being moved from its open position (FIG. 13) successively into its closed position (FIG. 15).
Figure 14:
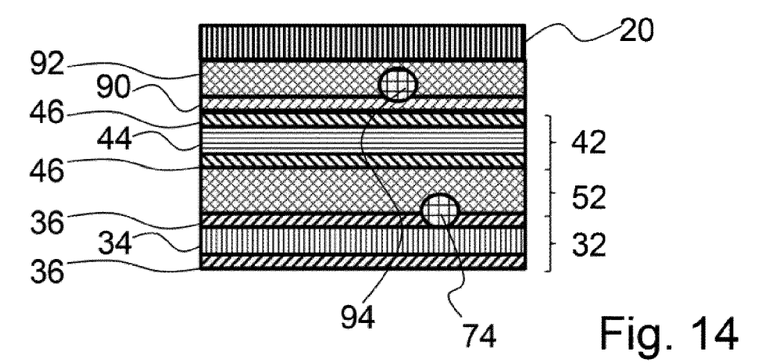
Figure 15:
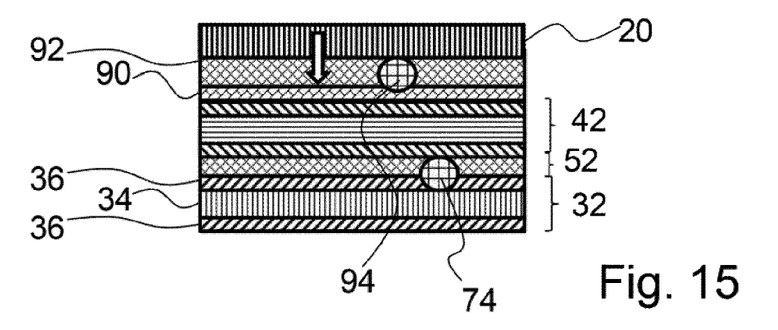

The system 1 from FIG. 11 likewise only differs from the system 1 from FIG. 1 with respect to its device 10 for compressing at least a portion 12 of an energy storage cell. The device 10 of the system 1 from FIG. 11 is designed for moving together a portion 12, which in this case is formed as a housing 90 with an insulating layer 92 provided along its outer circumferential surface. When the second shell element 20 is brought into its second position, the insulating layer 92 is consequently compressed, so that, when carrying out the high-voltage test on the compressed insulating layer, a foreign body 94 in the insulating layer 92 can be detected by way of the insulating layer 92. For this, the shell elements 16, 20 may advantageously be formed as current-conducting, at least along their contact surfaces with the insulating layer 92.

If the portion 12 of the energy storage cell also comprises the electrode assembly or is even formed by the entire energy storage cell, the separator 52 and the insulating layer 92 may be compressed at the same time. In particular, the compression of the separator 52 may take place by way of a hose element 80 described above in conjunction with FIGS. 6 to 10. Otherwise, the system 1 from FIG. 11 may have any, in particular all, of the features of the system from FIG. 1.

What is claimed is:

1. A device for compressing at least a portion of an energy storage cell, comprising:
    a first shell element with a first receiving portion, which is designed to at least partly receive the portion of the energy storage cell; and
    a second shell element, which is movable relative to the first shell element between an open position and a closed position;
    wherein, in the open position of the second shell element, the portion of the energy storage cell can be inserted into the device such that the portion of the energy storage cell is at least partly received in the first receiving portion; and
    wherein the first shell element and the second shell element in the closed position together define a cavity, which includes the first receiving portion and is designed to hold the portion of the energy storage cell clamped in place in such a way that the portion of the energy storage cell is elastically compressed.

2. The device according to claim 1,
    wherein the energy storage cell is a cylindrical energy storage cell or a prismatic energy storage cell, and/or
    wherein the portion of the energy storage cell comprises an electrode assembly, including an electrode coil, and/or an insulating layer arranged on an outer circumferential surface of the energy storage cell.

3. The device according to claim 2,
    wherein the first shell element and the second shell element have a same shape, and/or
    wherein the first shell element and the second shell element in the closed position are formed surface-symmetrically with respect to a plane of symmetry running centrally between the first shell element and the second shell element, and/or
    wherein the second shell element has a second receiving portion, the cavity also including the second receiving portion.

4. The device according to claim 2, further comprising:
    a limiting feature, which is designed to limit the compression of the portion of the energy storage cell by the first shell element and the second shell element to an elastic limit of the portion of the energy storage cell.

5. The device according claim 2,
    wherein, in the closed position of the second shell element, the portion of the energy storage cell is located completely in the cavity, and/or
    wherein the cavity is substantially closed, and/or
    wherein a geometrical shape of the cavity substantially corresponds to a geometrical shape of the portion of the energy storage cell, and/or
    wherein the first receiving portion is designed to hold the portion of the energy storage cell in an interlocking manner.

6. The device according claim 2,
    wherein the cavity is dimensioned, in a direction perpendicular to a main direction of extent of the portion of the energy storage cell, such that the portion of the energy storage cell is elastically compressed by a predetermined amount in the direction perpendicular to the main direction of extent when the second shell element is in the closed position.

7. The device according to claim 2,
    wherein the portion of the energy storage cell is an electrode assembly wound around a winding axis, and
    wherein the cavity is also defined by a stretchable hose element, which extends along the winding axis into the portion of the energy storage cell and is designed to press the portion of the energy storage cell in the direction of the first shell element and/or the second shell element by increasing a diameter of the hose element.

8. The device according to claim 1,
    wherein the first shell element and the second shell element have a same shape, and/or
    wherein the first shell element and the second shell element in the closed position are formed surface-symmetrically with respect to a plane of symmetry running centrally between the first shell element and the second shell element, and/or
    wherein the second shell element has a second receiving portion, the cavity also including the second receiving portion.

9. The device according to claim 8, further comprising:
    a limiting feature, which is designed to limit the compression of the portion of the energy storage cell by the first shell element and the second shell element to an elastic limit of the portion of the energy storage cell.

10. The device according claim 8,
    wherein, in the closed position of the second shell element, the portion of the energy storage cell is located completely in the cavity, and/or
    wherein the cavity is substantially closed, and/or
    wherein a geometrical shape of the cavity substantially corresponds to a geometrical shape of the portion of the energy storage cell, and/or
    wherein the first receiving portion is designed to hold the portion of the energy storage cell in an interlocking manner.

11. The device according claim 8,
    wherein the cavity is dimensioned, in a direction perpendicular to a main direction of extent of the portion of the energy storage cell, such that the portion of the energy storage cell is elastically compressed by a predetermined amount in the direction perpendicular to the main direction of extent when the second shell element is in the closed position.

12. The device according to claim 8,
    wherein the portion of the energy storage cell is an electrode assembly wound around a winding axis, and
    wherein the cavity is also defined by a stretchable hose element, which extends along the winding axis into the portion of the energy storage cell and is designed to press the portion of the energy storage cell in the direction of the first shell element and/or the second shell element by increasing a diameter of the hose element.

13. The device according to claim 1, further comprising:
    a limiting feature, which is designed to limit the compression of the portion of the energy storage cell by the first shell element and the second shell element to an elastic limit of the portion of the energy storage cell.

14. The device according to claim 1,
wherein, in the closed position of the second shell element, the portion of the energy storage cell is located completely in the cavity, and/or
wherein the cavity is substantially closed, and/or
wherein a geometrical shape of the cavity substantially corresponds to a geometrical shape of the portion of the energy storage cell, and/or
wherein the first receiving portion is designed to hold the portion of the energy storage cell in an interlocking manner.

15. The device according claim 1,
wherein the cavity is dimensioned, in a direction perpendicular to a main direction of extent of the portion of the energy storage cell, such that the portion of the energy storage cell is elastically compressed by a predetermined amount in the direction perpendicular to the main direction of extent when the second shell element is in the closed position.

16. The device according to claim 1,
wherein the portion of the energy storage cell is an electrode assembly wound around a winding axis, and
wherein the cavity is also defined by a stretchable hose element, which extends along the winding axis into the portion of the energy storage cell and is designed to press the portion of the energy storage cell in the direction of the first shell element and/or the second shell element by increasing a diameter of the hose element.

17. A method for electrical safety testing of a portion of an energy storage cell, the method comprising:
providing a device according to claim 1, the second shell element being in the open position;
positioning at least a region of the portion of the energy storage cell in the first receiving portion;
closing the device by moving the second shell element out of the open position into the closed position, the portion of the energy storage cell being clamped in place in the cavity in such a way that the portion of the energy storage cell is elastically compressed; and
carrying out an electrical safety test, including a voltage withstand test, on the elastically compressed portion of the energy storage cell.

18. The method according to claim 17, further comprising:
inserting a stretchable hose element parallel to the winding axis into the portion of the energy storage cell; and
increasing the diameter of the hose element by increasing the pressure in the interior of the hose element in order to press, and thereby compress, the portion of the energy storage cell in the direction of the first shell element and/or the second shell element;
wherein the portion of the energy storage cell is an electrode assembly wound around a winding axis; and
wherein the cavity is also defined by the stretchable hose element, which extends along the winding axis into the portion of the energy storage cell and is designed to press the portion of the energy storage cell in the direction of the first shell element and/or the second shell element by increasing a diameter of the hose element.

19. A system for electrical safety testing of a portion of an energy storage cell, comprising:
a device for compressing at least a portion of an energy storage cell, including:
a first shell element with a first receiving portion, which is designed to at least partly receive the portion of the energy storage cell; and
a second shell element, which is movable relative to the first shell element between an open position and a closed position;
wherein, in the open position of the second shell element, the portion of the energy storage cell can be inserted into the device such that the portion of the energy storage cell is at least partly received in the first receiving portion; and
wherein the first shell element and the second shell element in the closed position together define a cavity, which includes the first receiving portion and is designed to hold the portion of the energy storage cell clamped in place in such a way that the portion of the energy storage cell is elastically compressed; and
a device for electrical safety testing including a high-voltage tester.

* * * * *